United States Patent
DeLuca et al.

(10) Patent No.: US 9,514,443 B2
(45) Date of Patent: Dec. 6, 2016

(54) LOCATING PREVIOUSLY COMMUNICATED ELECTRONIC MESSAGES

(75) Inventors: Lisa Seacat DeLuca, San Francisco, CA (US); Soobaek Jang, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 13/400,179

(22) Filed: Feb. 20, 2012

(65) Prior Publication Data

US 2013/0218922 A1    Aug. 22, 2013

(51) Int. Cl.
   *G06F 7/00*        (2006.01)
   *G06Q 10/10*       (2012.01)

(52) U.S. Cl.
   CPC .................. *G06Q 10/107* (2013.01)

(58) Field of Classification Search
   None
   See application file for complete search history.

(56) References Cited

U.S. PATENT DOCUMENTS

| | | | |
|---|---|---|---|
| 2003/0149526 A1* | 8/2003 | Zhou et al. ................. | 701/213 |
| 2004/0122696 A1 | 6/2004 | Beringer | |
| 2004/0133413 A1 | 7/2004 | Beringer et al. | |
| 2007/0180040 A1* | 8/2007 | Etgen ................. | G06Q 10/107 709/207 |
| 2008/0147808 A1* | 6/2008 | Pang ............................ | 709/206 |
| 2008/0162651 A1* | 7/2008 | Madnani .............. | G06Q 10/107 709/206 |
| 2010/0083149 A1* | 4/2010 | McCaffrey et al. .......... | 715/764 |
| 2010/0169429 A1 | 7/2010 | O'Sullivan et al. | |
| 2011/0010355 A1* | 1/2011 | Warren ........................ | 707/706 |
| 2011/0159854 A1* | 6/2011 | Kedefors et al. .......... | 455/414.1 |
| 2011/0161984 A1* | 6/2011 | Jha et al. ...................... | 719/313 |

OTHER PUBLICATIONS

Tungare, M. et al., "Collaborative Human Computation as a Means of Information Management", Proceedings of the 2nd International Workshop on Collaborative Information Seeking at CSCW 2010, Savannah, Georgia.

* cited by examiner

*Primary Examiner* — Thu Nga Nguyen
(74) *Attorney, Agent, or Firm* — Maeve M. Carpenter; Maxine L. Barasch; Keohane & D'Alessandro PLLC

(57) ABSTRACT

Embodiments of the present invention provide an approach for locating previously communicated electronic messages (e.g., emails, etc.). Specifically, the system will receive a request to locate/retrieve a previously communicated electronic message ("message"). The request can be issued by a sender or a recipient of the message. In any event, the request will include a set (one or more) of characteristics pertaining to the message such as a set of recipients thereof. One or more electronic messaging databases will then be searched based on the set of recipients and the message located. Once located, an alert will be sent to the requester and/or other message parties. The alert will indicate the message that was located. If the alert is validated (e.g., the message was the correct message), the message will be displayed.

19 Claims, 5 Drawing Sheets

LOCATING PREVIOUSLY COMMUNICATED ELECTRONIC MESSAGES

TECHNICAL FIELD

The present invention relates generally to electronic messaging. Specifically, the present invention relates to the location of previously communicated electronic messages (e.g., email messages).

BACKGROUND OF THE INVENTION

As electronic messaging (e.g., email, instant messaging, social networking, etc.) has become the standard in communication, users are often left with a vast quantity of messages stored among multiple electronic messaging folders. As is often the case, a user may have to refer back to a previous message. Typically, the user's only solutions are to manually peruse the various folders, or to perform a search within the messaging application by sender, recipient, date, subject, etc. Both approaches can not only be inefficient, but also take longer as the quantity of messages stored increases.

SUMMARY OF THE INVENTION

In general, embodiments of the present invention provide an approach for locating previously communicated electronic messages (e.g., emails, etc.). Specifically, the system will receive a request to locate/retrieve a previously communicated electronic message ("message"). The request can be issued by a sender or a recipient of the message. In any event, the request will include a set (one or more) of characteristics pertaining to the message such as a set of recipients thereof. One or more electronic messaging databases will then be searched based on the set of recipients and the message located. Once located, an alert will be sent to the requester and/or other message parties. The alert will indicate the message that was located. If the alert is validated (e.g., the message was the correct message), the message will be displayed.

A first aspect of the present invention provides a computer-implemented method for locating previously communicated electronic messages, comprising: receiving a request from a party to a previously communicated electronic message to locate the previously communicated electronic message, the request identifying at least one of a set of recipients of the previously communicated electronic message; locating the previously communicated electronic message from an electronic database by comparing the set of recipients identified in the request to sets of recipients of a set of electronic messages stored in the electronic database; and sending an alert based on the locating.

A second aspect of the present invention provides a system for locating previously communicated electronic messages, comprising: a memory medium comprising instructions; a bus coupled to the memory medium; and a processor coupled to the bus that when executing the instructions causes the system to: receive a request from a party to a previously communicated electronic message to locate the previously communicated electronic message, the request identifying at least one of a set of recipients of the previously communicated electronic message; locate the previously communicated electronic message from an electronic database by comparing the set of recipients identified in the request to sets of recipients of a set of electronic messages stored in the electronic database; and send an alert based on the locating.

A third aspect of the present invention provides a computer program product for locating previously communicated electronic messages, the computer program product comprising a computer readable storage media, and program instructions stored on the computer readable storage media, to: receive a request from a party to a previously communicated electronic message to locate the previously communicated electronic message, the request identifying at least one of a set of recipients of the previously communicated electronic message; locate the previously communicated electronic message from an electronic database by comparing the set of recipients identified in the request to sets of recipients of a set of electronic messages stored in the electronic database; and send an alert based on the locating.

A fourth aspect of the present invention provides a method for deploying a system for locating previously communicated electronic messages, comprising: providing a computer infrastructure being operable to: receive a request from a party to a previously communicated electronic message to locate the previously communicated electronic message, the request identifying at least one of a set of recipients of the previously communicated electronic message; locate the previously communicated electronic message from an electronic database by comparing the set of recipients identified in the request to sets of recipients of a set of electronic messages stored in the electronic database; and send an alert based on the locating.

BRIEF DESCRIPTION OF THE DRAWINGS

These and other features of this invention will be more readily understood from the following detailed description of the various aspects of the invention taken in conjunction with the accompanying drawings in which.

Figure 1:
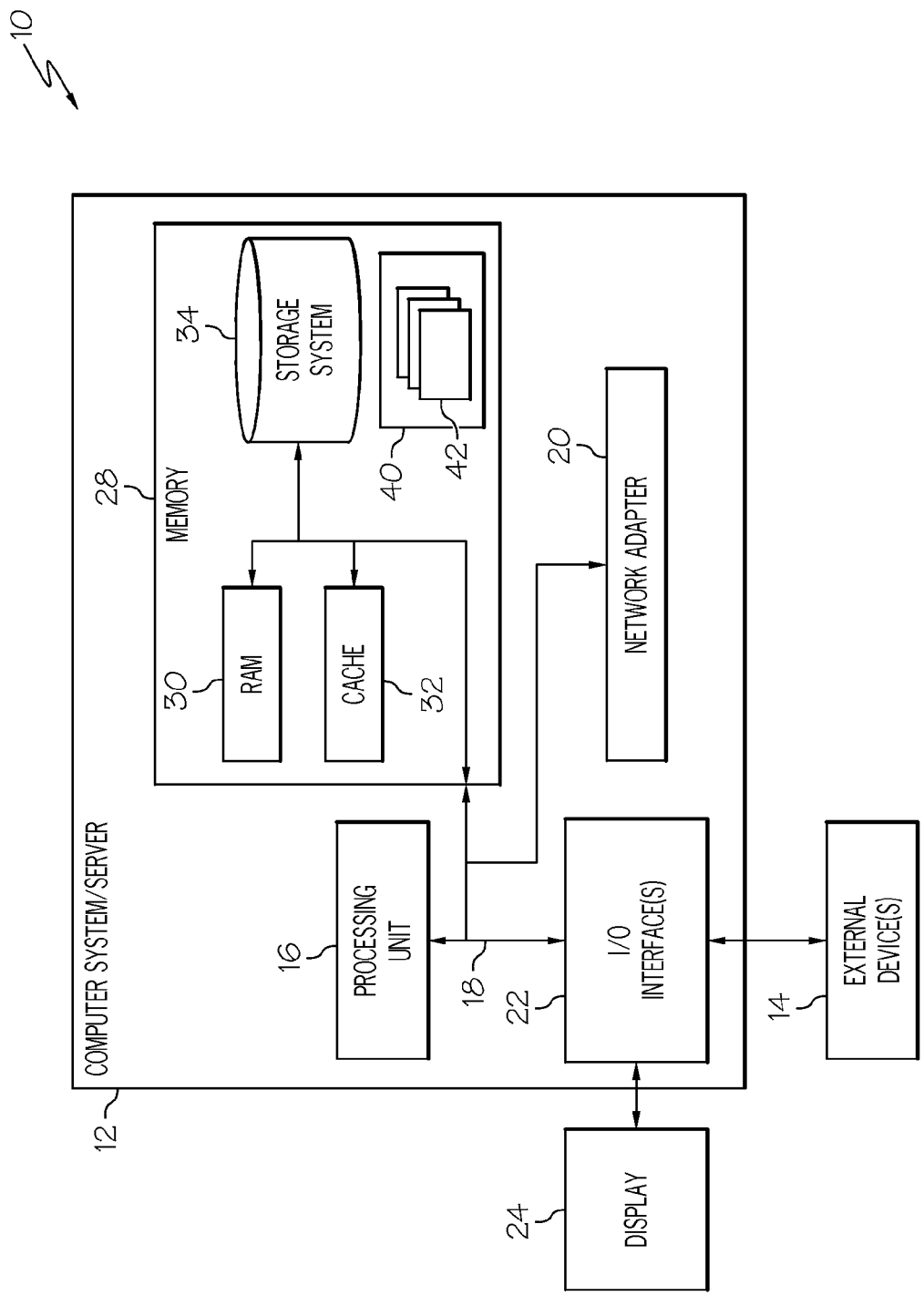
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As mentioned above, embodiments of the present invention provide an approach for locating previously communicated electronic messages (e.g., emails, etc.). Specifically, the system will receive a request to locate/retrieve a previously communicated electronic message ("message"). The request can be issued by a sender or a recipient of the message. In any event, the request will include a set (one or more) of characteristics pertaining to the message such as a set of recipients thereof. One or more electronic messaging databases will then be searched based on the set of recipients and the message located. Once located, an alert will be sent to the requester and/or other message parties. The alert will indicate the message that was located. If the alert is validated (e.g., the message was the correct message), the message will be displayed.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Electronic message location program/utility 40, having a set (at least one) of program modules 42, may be stored in memory 28 by way of example, and not limitation, as well as an operating system, one or more application programs, other program modules, and program data. In general, electronic message location program 40 performs the function of the present invention as described herein. For example, electronic message location program 40 will:

receive a prescription related to a medical condition of a patient in a computer memory medium (e.g., comprising a set of criteria for a desired travel route for the patient); receive information corresponding to a geographical area associated with the patient; identify a set of possible travel routes between a starting point and a destination within the geographical area based on the information; determine at least one travel route from the possible travel routes for treating the medical condition based on a comparison of the set of criteria to the information; and/or recommend the at least one travel route to the patient. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
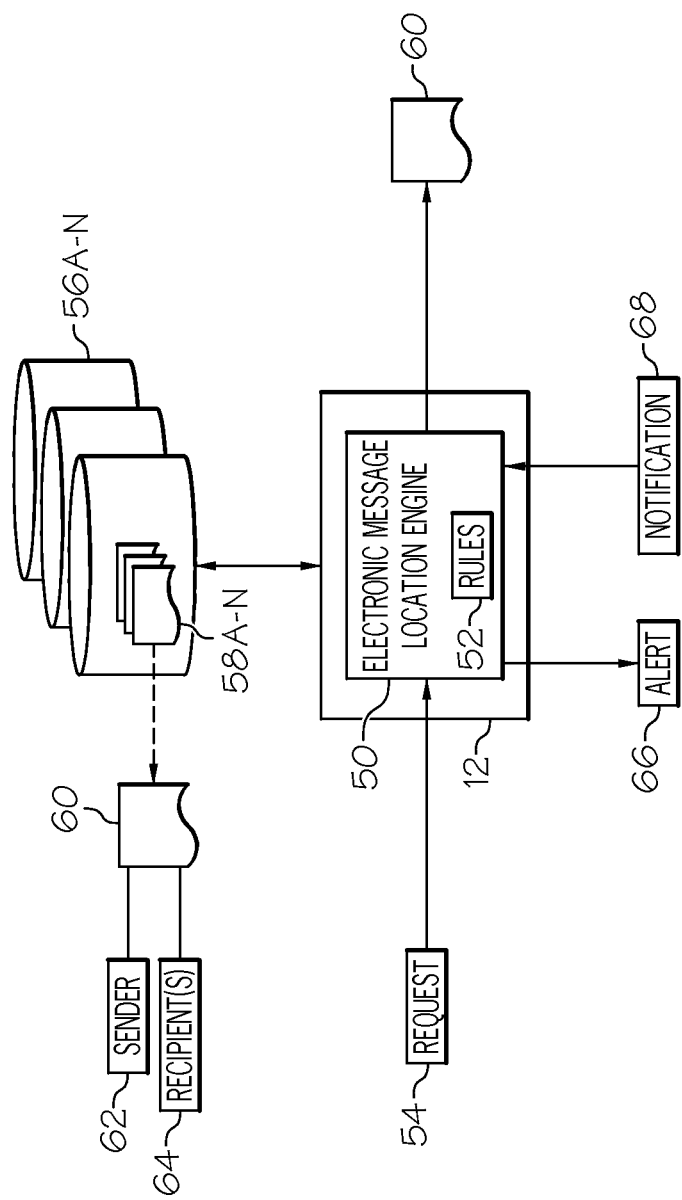
FIG. 2 depicts a system diagram according to an embodiment of the present invention.

Referring now to FIG. 2, a system diagram capable of implementing the functionality discussed herein according to an embodiment of the present invention is shown. It is understood that the teachings recited herein may be practiced within any type of networked computing environment (e.g., a cloud computing environment). A stand-alone computer system/server 12 is shown in FIG. 1 for simplicity purposes only. In the event the teachings recited herein are practiced in a networked computing environment, each client need not have an electronic message location engine (engine 50). Rather, engine 50 could be loaded on a server or server-capable device that communicates (e.g., wirelessly) with the clients to provide message location functionality hereunder. Regardless, as depicted, engine 50 is shown within computer system/server 12. In general, engine 50 can be implemented as program/utility 40 on computer system 12 of FIG. 1 and can enable the functions recited herein. As further shown, engine 50 (in one embodiment) comprises a rules and/or computational engine that processes a set (at least one) of rules/logic 52 and/or provides virtual machine availability control hereunder.

Along these lines, engine 50 may perform multiple functions similar to a general-purpose computer. Specifically, among other functions, engine 50 may (among other things): receive a request 54 from a party (e.g., sender 62 and/or recipient(s) 64) to a previously communicated electronic message 60 to locate the previously communicated electronic message 60, the request 54 identifying at least one of a set of recipients of the previously communicated electronic message 60; locate the previously communicated electronic message 60 from an electronic database 56A-N by comparing the set of recipients identified in the request 54 to sets of recipients of a set of electronic messages 58A-N stored in the electronic database 56A-N; send an alert 66 (e.g., to the requesting party); receive an acceptance notification 68 in response to the alert 66; present the previously communicated electronic message 60 (e.g., along with a set of previously communicated electronic messages that identifies the same set of recipients to at least one of the following: a sender 62 of the previously communicated electronic message 60, or at least one of the set of recipients 64 of the previously communicated electronic message 60.

Illustrative Implementation

The following section describes an illustrative implementation of the embodiments of the present invention. As indicated above, the process begins with a request to locate an electronic message. The request can be submitted by a sender and/or a recipient of the message.

Figure 3:
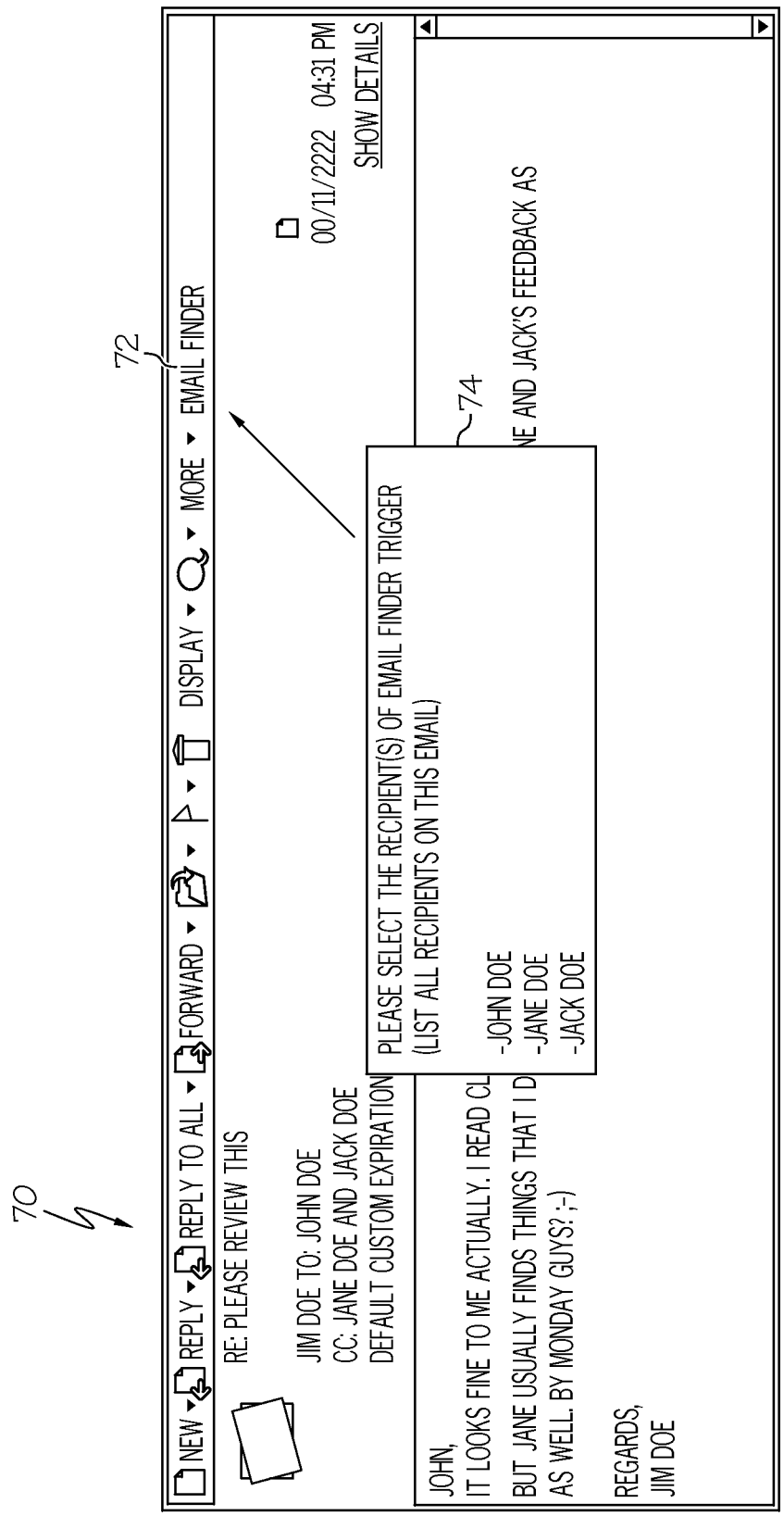
FIG. 3 depicts a screen shot according to an embodiment of the present invention.

Referring now to FIG. 3, an exemplary screen shot depicting an interface 70 provided hereunder is shown. In this example, interface 70 is an electronic message. As depicted, finder button 72 or the like can be provided (e.g., via engine 50 of FIG. 2) within an electronic message and/or the underlying messaging application. Upon selecting finder button 72, a window 74 can be generated that allows for selection of message characteristics. In a typical embodiment, the requesting user can then select recipients of a previous electronic message he/she wishes to locate. In a typical embodiment, a default setting can be set up to initially select recipients of message 70 via which finder button 72 was activated. However, this need not be the case.

In an alternate embodiment, rather than the user picking amongst a list of original recipients to an email message, the individual wishing to trigger the email recall function as proposed in this invention could optionally drag and drop the email message within an instant messaging conversation or the like. In response, the email client could be configured to recognize the action and open the email.

In any event, once the requesting user has selected one or more recipients of the previous electronic message, engine 50 (FIG. 2) will search database(s) 56A-N based thereon and retrieve any message with recipients that match the designated set of recipients. If results are found, an alert can be sent to the requesting user as described above. The alert can comprises the results populated into a list or the like.

Figure 4:
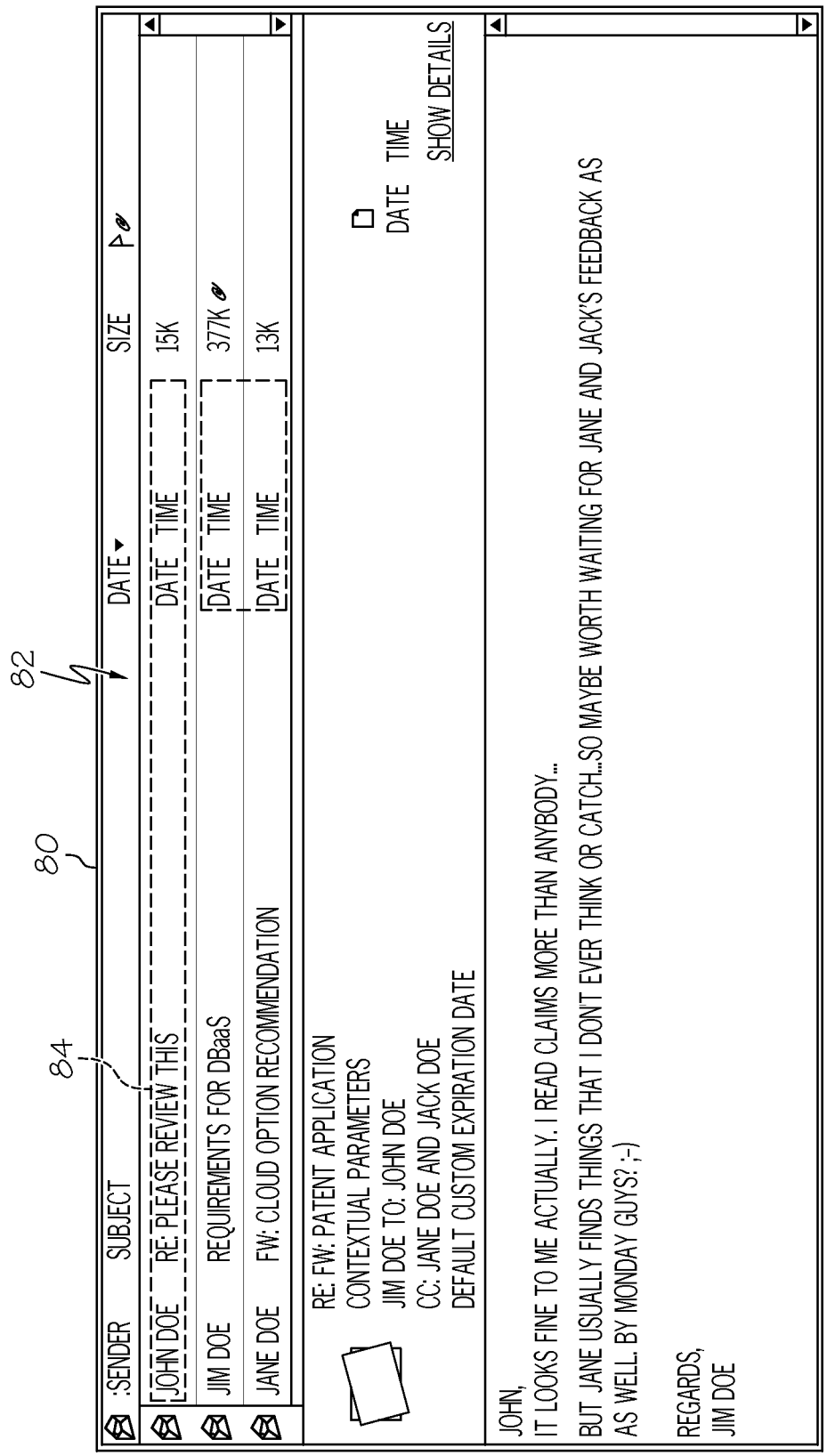
FIG. 4 depicts another screen shot according to an embodiment of the present invention.

Referring now to FIG. 4, an illustrative example of such a list 82 of results 80 is shown. As depicted, list 82 comprises a set of electronic messages 84 with recipients that match the designated recipients. The user can then select a particular message 84 from the list 82. In so doing, an acceptance notification will be generated and returned to the system, and the selected message 84 will be presented. If none of the messages 82 in the list of results 80 match, a rejection notification can be sent, and the search conducted again (e.g., based on different characteristics).

Figure 5:
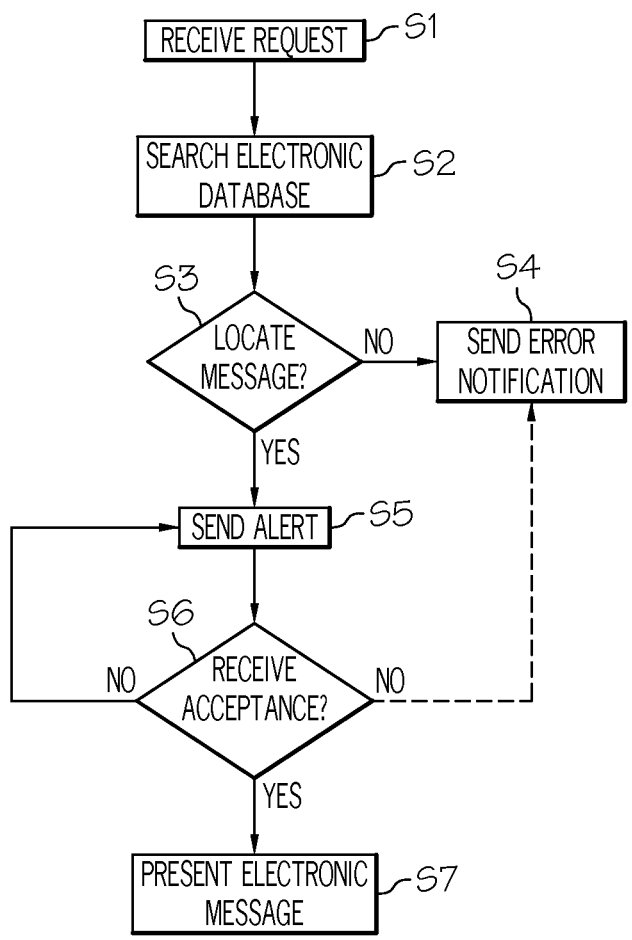
FIG. 5 depicts a method flow diagram according to an embodiment of the present invention.

Referring now to FIG. 5, a method flow diagram according to an embodiment of the present invention is shown (e.g., as enabled by engine 50 of FIG. 2). As depicted, in step S1, a request to locate is received to locate a previously communicated electronic message. As indicated above, the request may identify at least one of a set of recipients of the previously communicated electronic message. In step S2, at least one electronic database is searched based on the set of recipients. In step S3, it is determined whether the desired previously communicated electronic message can be located (i.e., if there was a matching message in the database(s)). If not, an error notification could be sent in step S4. If so, an alert may be generated and sent (e.g., to the requesting party and/or other users) in step S5. In step S6, it is determined whether an acceptance notification was received in response to the alert. If not, the alert can be resent in step S5. If an acceptance notification is not received after a predetermined number of times the alert is resent, an error notification can be sent in step S4. However, if an acceptance notification is received in step S6, the associated electronic message can be presented in step S7 (e.g., to the requesting party, the sender of the message, the recipient(s) of the message, etc.).

The flowchart of FIG. 5 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an electronic message location solution, it is understood that the invention further provides various alternative embodiments. For example, in one embodiment, the invention provides a computer-readable/usable medium that includes computer program code to enable a computer infrastructure to provide electronic message location functionality as discussed herein. To this extent, the computer-readable/usable medium includes program code that implements each of the various processes of the invention. It is understood that the terms computer-readable medium or computer-usable medium comprise one or more of any type of physical embodiment of the program code. In particular, the computer-readable/usable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide electronic message location functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for electronic message location. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for locating previously communicated electronic messages, comprising:
providing, in a window of a particular electronic message, a locator feature presenting a plurality of identifiers each corresponding to one of a plurality of parties to the one particular electronic message;
receiving a request, from a first party of the plurality of parties, to locate at least one previously communicated electronic message to select of at least one identifier of the plurality of identifiers;
in response to receiving the selection, performing a search of at least one electronic database for another electronic message comprising the at least one previously communicated electronic message having as a party thereto at least one party, of the plurality of parties, to which the at least one selected identifier corresponds;

when the at least one previously communicated electronic message is located, based on the search, from the electronic database, sending an alert based on the locating to the first party and second party;

when an acceptance notification is received from at least one of the first party and the second party in response to the alert, presenting one of the at least one previously communicated electronic message to the first party and the second party in response to the acceptance notification; and when an acceptance notification is not received in response to the alert, resending the alert a predetermined number of times, and when the acceptance notification is not received in response to the resending, sending an error notification;

when the at least one previously communicated electronic message is not located from the electronic database, based on the search, sending the error notification;

wherein the sending an alert based on the locating to the first party and the second party comprises displaying a list of the located of the at least one previously communicated electronic message;

wherein the receiving an acceptance notification from at least one of the first party and the second party in response to the alert comprises receiving a selection of one of the at least one previously communicated electronic message from the list by at least one of the first party and the second party from at least one of the first party and the second party in response to the alert; and wherein the presenting one of the at least one previously communicated electronic message to the first party and the second party in response to the acceptance notification comprises presenting the selected one of the at least one previously communicated electronic message.

2. The computer-implemented method of claim 1, the first party comprising a sender or a receiver of the at least one previously communicated electronic message.

3. The computer-implemented method of claim 1, the particular electronic message and the previously communicated electronic message each comprising an email message.

4. The computer-implemented method of claim 1, the presenting comprising displaying the at least one previously communicated electronic message to the second party at a top of an electronic message inbox.

5. The computer-implemented method of claim 4, the at least one previously communicated electronic message being displayed highlighted in a separate window within the electronic message inbox.

6. A system for locating previously communicated electronic messages, comprising:
a memory medium comprising instructions; a bus coupled to the memory medium; and
a processor coupled to the bus that when executing the instructions causes the system to:
receive: a drag of a particular electronic message from a messaging application, and a drop of the particular electronic message to an instant messaging conversation;
open an email in response to the receiving; perform a search of at least one electronic database for a previously communicated electronic message having a party matching at least one of a plurality of parties to the electronic message;
perform a search of at least one electronic database for the previously communicated electronic message;

receiving a request, from a first party of the plurality of parties, to locate at least one previously communicated electronic message;

when the at least one previously communicated electronic message is located, based on the search, from the electronic database, send an alert based on the locating to the first party and second party;

when an acceptance notification is received from at least one of the first party and the second party in response to the alert, present one of the at least one previously communicated electronic message to the first party and the second party in response to the acceptance notification; and when an acceptance notification is not received in response to the alert, resend the alert a predetermined number of times, and when the acceptance notification is not received in response to the resending, send an error notification;

when the at least one previously communicated electronic message is not located from the electronic database, based on the search, send the error notification;

wherein the sending an alert based on the locating to the first party and the second party comprises displaying a list of the located of the at least one previously communicated electronic message;

wherein the receiving an acceptance notification from at least one of the first party and the second party in response to the alert comprises receiving a selection of one of the at least one previously communicated electronic message from the list by at least one of the first party and the second party; and wherein the presenting one of the at least one previously communicated electronic message to the first party and the second party in response to the acceptance notification comprises presenting the selected one of the at least one previously communicated electronic message.

7. The system of claim 6, the first party comprising a sender or a receiver of the at least one previously communicated electronic message.

8. The system of claim 6, the particular electronic message and the previously communicated electronic message each comprising an email message.

9. The system of claim 6, the memory medium further comprising instructions for causing the system to display the at least one previously communicated electronic message to the second party at a top of an electronic message inbox.

10. The system of claim 9, the at least one previously communicated electronic message being displayed highlighted in a separate window within the electronic message inbox.

11. A computer program product for locating previously communicated electronic messages, the computer program product comprising a computer readable storage device, wherein the computer readable storage device is not a transitory signal per se, and wherein program instructions are stored on the computer readable storage device, to:
provide, in a window of a particular electronic message, a locator feature presenting a plurality of identifiers each corresponding to one of a plurality of parties to the one particular electronic message;
receiving a request, from a first party of the plurality of parties, to locate at least one previously communicated electronic message to select of at least one identifier of the plurality of identifiers;
in response to receiving the selection, performing a search of at least one electronic database for another electronic message comprising the at least previously communicated electronic message having as a party thereto at least one party, of the plurality of parties, to which the at least one selected identifier corresponds;

when the at least one previously communicated electronic message is located, based on the search, from the electronic database, send an alert based on the locating to the first party and second party;

when an acceptance notification is received from at least one of the first party and the second party in response to the alert, present one of the at least one previously communicated electronic message to the first party and the second party in response to the acceptance notification; and when an acceptance notification is not received in response to the alert, resend the alert a predetermined number of times, and when the acceptance notification is not received in response to the resending, send an error notification;

when the at least one previously communicated electronic message is not located from the electronic database, based on the search, send the error notification;

wherein the sending an alert based on the locating to the first party and the second party comprises displaying a list of the located of the at least one previously communicated electronic message;

wherein the receiving an acceptance notification from at least one of the first party and the second party in response to the alert comprises receiving a selection of one of the at least one previously communicated electronic message from the list by at least one of the first party and the second party from at least one of the first party and the second party in response to the alert; and wherein the presenting one of the at least one previously communicated electronic message to the first party and the second party in response to the acceptance notification comprises presenting the selected one of the at least one previously communicated electronic message.

12. The computer program product of claim 11, the first party comprising a sender or a receiver of the at least one previously communicated electronic message.

13. The computer program product of claim 11, the particular electronic message and the previously communicated electronic message each comprising an email message.

14. The computer program product of claim 11, the computer readable storage device further comprising instructions for causing the system to display the at least one previously communicated electronic message to the second party at a top of an electronic message inbox.

15. The computer program product of claim 14, the at least one previously communicated electronic message being displayed highlighted in a separate window within the electronic message inbox.

16. A method for deploying a system for locating previously communicated electronic messages, comprising:

providing a computer infrastructure being operable to:

receive: a drag of a particular electronic message from a messaging application, and a drop of the particular electronic message to an instant messaging conversation;

open an email in response to the receiving;

perform a search of at least one electronic database for a previously communicated electronic message having a party matching at least one of a plurality of parties to the electronic message;

perform a search of at least one electronic database for the previously communicated electronic message;

receive a request, from a first party of the plurality of parties, to locate at least one previously communicated electronic message;

when the at least one previously communicated electronic message is located, based on the search, from the electronic database, send an alert based on the locating to the first party and second party;

when an acceptance notification is received from at least one of the first party and the second party in response to the alert, present one of the at least one previously communicated electronic message to the first party and the second party in response to the acceptance notification; and when an acceptance notification is not received in response to the alert, resend the alert a predetermined number of times, and when the acceptance notification is not received in response to the resending, send an error notification;

when the at least one previously communicated electronic message is not located from the electronic database, based on the search, send the error notification;

wherein the sending an alert based on the locating to the first party and the second party comprises displaying a list of the located of the at least one previously communicated electronic message;

wherein the receiving an acceptance notification from at least one of the first party and the second party in response to the alert comprises receiving a selection of one of the at least one previously communicated electronic message from the list by at least one of the first party and the second party; and wherein the presenting one of the at least one previously communicated electronic message to the first party and the second party in response to the acceptance notification comprises presenting the selected one of the at least one previously communicated electronic message.

17. The computer-implemented method of claim 1, wherein the providing occurs responsive to a selection of a button in the particular electronic message by the first party.

18. The system of claim 6, wherein the providing occurs responsive to a selection of a button in the particular electronic message by the first party.

19. The computer program product of claim 11, wherein the providing occurs responsive to a selection of a button in the particular electronic message by the first party.

* * * * *